United States Patent [19]

Ullman

[11] 4,236,865
[45] Dec. 2, 1980

[54] METHOD FOR CONTROLLING THE FLOW OF ARTICLES AND PALLETS IN A CONVEYOR SYSTEM

[76] Inventor: Frederick E. Ullman, 245 Green Bay Rd., Glencoe, Ill. 60022

[21] Appl. No.: 914,341

[22] Filed: Jun. 12, 1978

[51] Int. Cl.³ .......................................... B65G 13/075
[52] U.S. Cl. ................................ 414/786; 193/35 A; 414/276
[58] Field of Search ............... 414/276, 281, 786, 397, 414/398; 193/35 A, 40, 32; 198/492

[56] References Cited

U.S. PATENT DOCUMENTS

| | | | |
|---|---|---|---|
| 2,565,001 | 8/1951 | Schutt | 193/35 A |
| 3,532,201 | 10/1970 | McConnell | 193/35 A |
| 3,627,092 | 12/1971 | Fleischauer | 193/35 A |
| 3,891,073 | 6/1975 | Coleman et al. | 193/40 X |

*Primary Examiner*—Robert G. Sheridan
*Assistant Examiner*—Edmond G. Rishell, Jr.
*Attorney, Agent, or Firm*—Clement and Ryan

[57] ABSTRACT

In a system wherein pallets and their loads are conveyed along paths to one or more unloading stations, a method of preventing piling up at the station and of load-shifting of stopped pallets, comprising the step of, in sequence, sensing the arrival of a pallet at the unloading station, applying a braking force to the underside of an arriving upstream pallet at an upstream position so as to decelerate it gradually and safely to a stop at a distance from the unloading station pallet, unloading the pallet from the unloading station and relieving the braking force from the upstream pallet so it can be conveyed onto the unloading station. The apparatus is in the form of a holdback assembly having a feeler assembly adjacent the unloading station responsive to a pallet or article moving into the unloading station for actuating a brake assembly to apply a braking force to the underside of the upstream pallet or to the engageable surface of the upstream article. The inertial energy of a downstream pallet or article moving into the unloading station provides the energy for actuating the brake assembly.

5 Claims, 13 Drawing Figures

METHOD FOR CONTROLLING THE FLOW OF ARTICLES AND PALLETS IN A CONVEYOR SYSTEM

BACKGROUND OF THE INVENTION

This invention relates to a conveyor system, and more particularly, to a holdback assembly and method for controllably stopping and holding one or more moving upstream pallets prior to contact with a stationary pallet.

In gravity flow conveyor systems presently in use, velocity control brakes are used generally to control pallet velocity in flow lanes to speeds of from 30 feet to 60 feet per minute. Stops are used to bring a downstream pallet to a stop at an unloading station at the end of the flow lane.

Prior art gravity flow conveyor systems have also included means for stopping upstream pallets, and such means have taken the form of a stop member that is movable upwardly after a pallet has passed over and reached the unloading station. The stop member generally contacts the leading edge of the next pallet, and because this pallet is abruptly decelerated and stopped, it has been common for the load thereon to shift or spill. Further, many pallets have crossboards on the bottom deck separated by gaps ranging from 1 inch to as much as 9 or 10 inches, and if the pallet following the first pallet into the unloading station has not been separated from the pallet in the unloading station by a sufficient gap by the aforesaid velocity control brake, the raising of the stop member may engage the leading edge of the pallet at a point where its upward motion may be prevented by the presence of a crossboard. When solid deck pallets are utilized, the pallet will scrape along the top of the stop member, and in both instances, damage to the pallets may be caused, and the holdback function is not performed in a consistent, controlled manner.

Desirably, once the downstream pallet at the unloading station has been unloaded, the next pallet upstream is released to flow downstream to the unloading station for subsequent unloading. Some of the prior art systems, however, have a tendency to release one or more upstream pallets before the downstream pallet at the unloading station has been completely loaded, causing the next upstream pallet to contact the downstream pallet being lifted. Such conditions may cause load damage and/or spillage, and may create dangerous working conditions for personnel adjacent the unloading station.

It is therefore desirable to provide an improved method and apparatus to overcome the preceding problems.

SUMMARY OF THE INVENTION

An improved method and apparatus is provided for effectively controlling the flow of pallets in a pallet flow system so as to permit safe unloading of the pallets. The novel method and apparatus prevent moving pallets from contacting stationary pallets at the unloading stations and thereby minimizes pallet damage and load shifting and/or spillage.

In accordance with principles of the present invention, the inventive method includes: conveying a first pallet to an unloading station and sensing the presence of the pallet at the unloading station; conveying a second pallet to a braking station located upstream of the unloading station; using the inertial energy of the downstream pallet moving into the unloading station to apply a braking force along the underside of the second pallet at the braking station to gradually decelerate and safely stop the second pallet without shifting or spilling the load of the second pallet; and, concurrently, preventing the second pallet from contact with the first pallet at the unloading station; holding the second pallet while the first pallet is at the unloading station; subsequently, unloading the first pallet from the unloading station; sensing the unloading of the first pallet from the unloading station, and, thereafter, releasing the braking force from the second pallet and conveying the released second pallet downstream to the unloading station.

Preferably, a gradually increasing braking force is first applied to the underside of the second pallet, and immediately and continuously thereafter, a constant braking force is applied to the underside of the second pallet. The constant braking force is greater than the gradually increasing braking force. Desirably, the gradually increasing force is applied for about 25% to about 50% of the total braking time, and the constant force is thereafter applied for about 50% to about 75% of the total braking time. The total braking time is, of course, a function of the pallet velocity prior to application of the braking force and the deceleration rate attributable to the braking means. Preferably, the braking force is applied along the underside of the second pallet at a location spaced upstream from the leading edge of the second pallet. The amount of braking force can be adjusted and is generally in the range from about 100 pounds to about 1200 pounds to provide the specific force required for a given application.

In the preferred method, the second pallet is held and spaced upstream of the first pallet in order to prevent the second pallet from contacting the first pallet. The pallet at the unloading station is removed, as by a forklift truck, by lifting it above the unloading station and moving it away from the unloading station along the axis of its earlier motion. Advantageously, the braking force is released only after the first pallet has been lifted and moved beyond the unloading station to prevent the second pallet from contacting the first pallet as the first pallet is being lifted and removed.

In the preferred method, the step of sensing the presence of the first pallet as it moves into the unloading station includes engaging the underside of the first pallet.

When pallet deflection is large, the preferred method further includes the steps of sensing the presence of the second pallet at the braking station after the first pallet has arrived at the unloading station, and applying a braking force to the underside of the second pallet only after the leading edge of the second pallet has traveled past the location of application of the braking force. This results in constant braking force being applied during most of the braking time.

The method further provides for sequentially stopping and holding a series of upstream pallets generally at, and immediately upstream of, the braking station in an end-to-end relationship. In the illustrative method, the maximum braking force is about 10% to about 25% greater than the total static downstream force of the upstream pallets being stopped and held, with the total static downstream force generally being about 2% of the combined weight and load of the upstream pallets, but considerably higher in some instances.

The inventive method is also useful in controlling the flow of other articles, such as machinery, packages and the like, in gravity flow conveyor systems. In such circumstances, a braking force is applied along an engageable surface of the upstream article extending in the direction of flow in response to the presence of a downstream article at the unloading station. Advantageously, the upstream article is controllably stopped without spilling the load and prevented from contacting the downstream article at the unloading station. Typically, the engageable surface of the article is the bottom or underside of the article, but it may be desirable in some circumstances that the engageable surface be the sides of or top of the article.

While the method of the present invention has particular utility in gravity feed conveyor systems, it should be understood that the pallet or article holdback method also has applicability in certain types of power driven conveyor systems which apply a driving force to the pallet or article to cause it to move on a conveyor. In such systems, when a pallet or article is stopped or held from movement, it is common to disengage the drive, or introduce a slippage in the drive train, and it will be appreciated that the method and apparatus of the present invention may be used in such conveyor systems to hold back upstream pallets or articles.

While various devices can be utilized to provide the novel method of this invention, the preferred device is in the form of a holdback assembly having a sensing mechanism or feeler assembly for sensing the presence of a downstream pallet or article at the unloading station. The feeler assembly utilizes the momentum of the pallet moving into the unloading station to energize the braking assembly for slowing and stopping the following pallet. The braking assembly is positioned upstream of the unloading station and applies a braking force along the underside of the upstream pallet or along the engageable surface of the upstream article, generally upstream of the leading edge of the upstream pallet or article. Advantageously, the brake assembly only applies a braking force against the upstream pallet or article in response to the presence of the downstream pallet or article at the unloading station, and controllably stops the upstream pallet or article without spilling.

The brake assembly is constructed and arranged to hold and space the upstream pallet or article away from the downstream pallet or article, while the downstream pallet or article is at the unloading station, so as to substantially prevent the upstream pallet or article from contacting the downstream pallet or article at the unloading station and interfering with the unloading of the downstream pallet or article.

The brake assembly of the present invention includes a brake member which is pivotable by a linkage assembly from a released position, spaced generally away from the underside of the upstream pallet or the engageable surface of the upstream article, to a braking position, bearing against and engaging the underside of the upstream pallet or the engageable surface of the upstream article. The linkage assembly is arranged to provide a force multiplication effect for exerting a braking force which is sufficient not only to decelerate and arrest the movement of a single loaded pallet, but which is also adequate to hold a following series of pallets or articles in end to end relationship adjacent the braking station. A brake spring assembly is associated with the linkage assembly for controlling the braking force that is applied to a pallet in the braking station, and to provide a means for varying the braking force.

In the preferred form, the brake includes a friction pad mounted thereon preferably formed of an elastomeric material having a generally high coefficient of friction with the pallets being conveyed and which is designed to bear against and engage the underside of the upstream pallet. In the illustrative embodiment, the brake has a downwardly inclined lip or lead in surface, generally facing the oncoming flow of upstream pallets. In some circumstances, it is desirable that the brake be a one piece unitary assembly with an integral friction pad.

The undersurfaces of the pallet travel generally along a line at the lower extremity of the flow path, hereafter called the "pass line", and the feeler assembly at the unloading station includes at least one feeler that normally extends upwardly at an angle inclined generally in the direction of flow. The pallet moving into the unloading station moves the feeler from the upward position toward a downward position, and the movement of the feeler is utilized to elevate the braking assembly and to transmit a gradually increasing braking force to an upstream pallet at the braking station. The braking assembly includes a linkage return spring means for urging the linkage assembly toward a downward position, as well as for normally biasing the feeler to an upward pallet sensing position.

In some circumstances, such as when pallet deflection is large, it is desirable to provide a latch assembly for preventing the brake from contacting the upstream pallet until the upstream pallet is located above the brake and the leading edge of the upstream pallet has moved downstream of the brake. The latch assembly has at least one strike bar which is pivotally connected to the linkage assembly. The strike bar normally extends to an upward sensing position above the pass line at a location generally downstream of the brake. In the preferred form, the intermediate portion of the strike bar generally defines an upwardly facing notch or U-shaped channel which provides a latch to prevent actuation of the brake when the strike bar is in the upward sensing position.

The strike bar is constructed and arranged to be movable from an upward sensing position above the pass line for engaging the leading edge of the upstream pallet, to a downward pallet-engaging position for engaging the underside of the upstream pallet. In the illustrative embodiment the strike bar is inclined generally in the direction of flow and has a generally rounded upper end for engaging and being ridden upon by the upstream pallet. A latch return spring assembly is provided for urging the strike bar to its upward sensing position.

In the preferred embodiment, at least one drag link spring assembly with one or more drag link compression springs is provided for use with the latch assembly. The drag link compression springs are compressible to a cocked position when the feeler is in the downward pallet-engaging position and are expandable to a released position for urging the brake to its braking position when the strike bar has been tripped by the upstream pallet to release the latch and allow the cocked drag link spring to actuate the brake. The drag link compression springs are precompressed to a force greater than that required to raise the feeler to its upward sensing position, so that the feeler will be automatically raised once the downstream pallet has been unloaded.

A more detailed explanation of the invention is provided in the following description and appended claims taken in conjunction with the accompanying drawings.

DETAILED DESCRIPTION OF THE ILLUSTRATIVE EMBODIMENT

General

Figure 1:
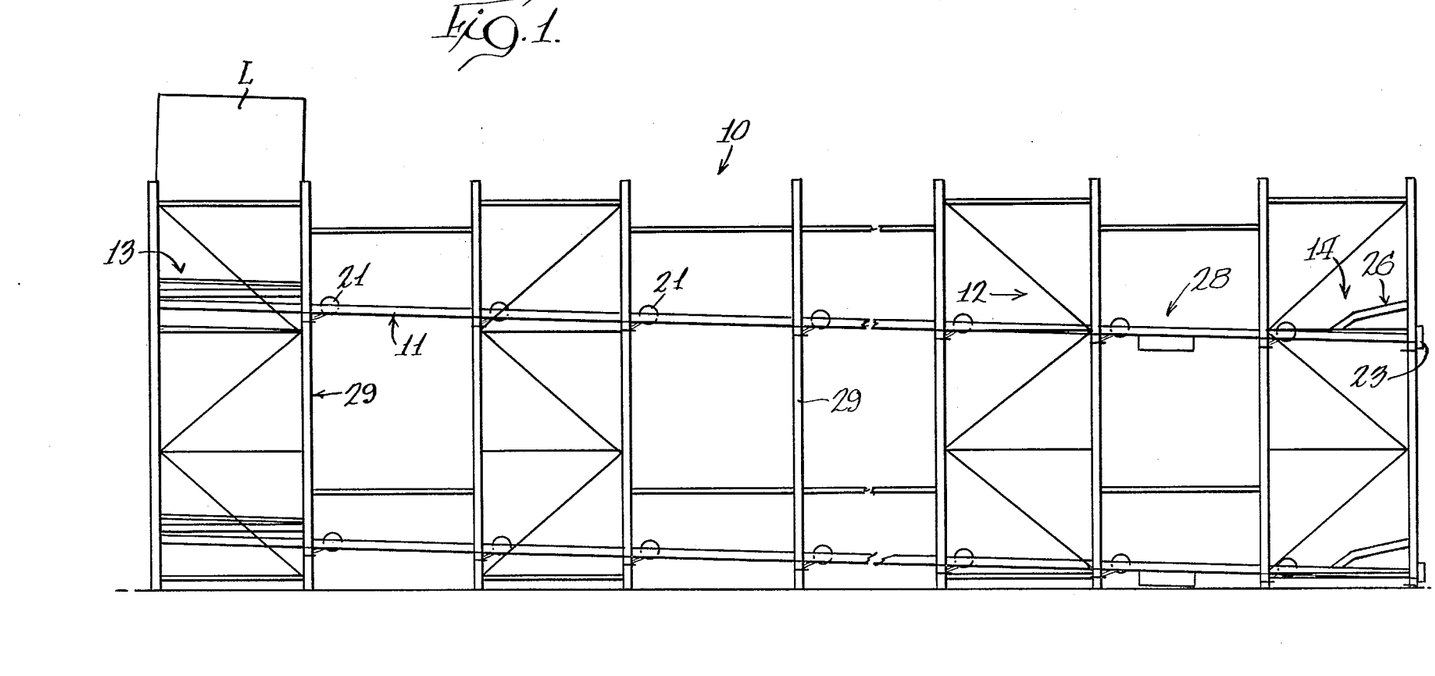
FIG. 1 is a broken side-elevational view of a pallet flow system incorporating the invention of the present application.
Figure 2:
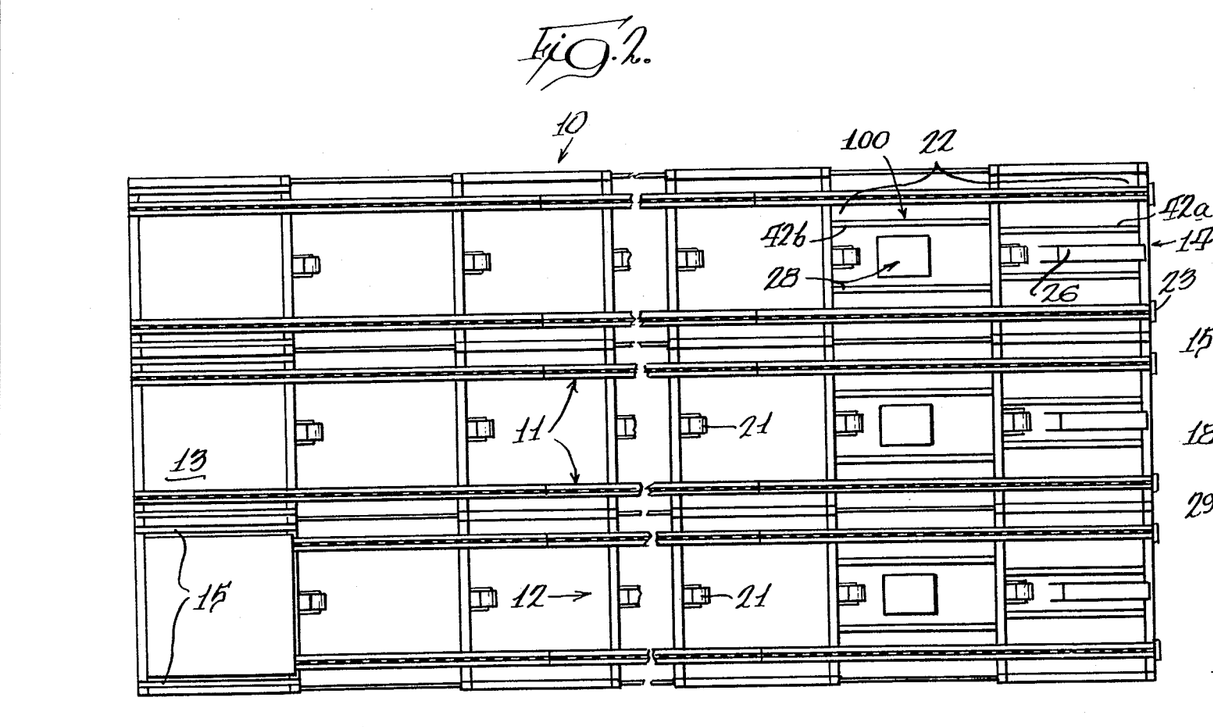
FIG. 2 is a top plan view of the system shown in FIG. 1.
Figure 3:
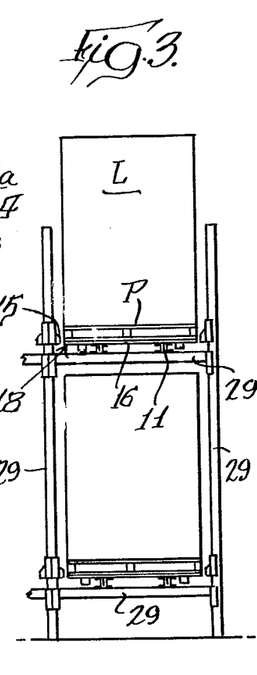
FIG. 3 is an end elevational view of the system shown in FIG. 1.

FIGS. 1-3 of the drawings illustrate a gravity flow conveyor system or pallet flow system 10 in which a downwardly inclined gravity conveyor 11 conveys a series of pallets P from a loading station 13, at its top end, to an unloading station 14, at its bottom end, along a flow lane or path 12, from left to right in FIG. 1. Unloading station 14 is at a lower elevation than the upstream portion of flow lane 12, so that the pallets P will move down to the unloading station 14 on conveyor 11 solely by the action of gravity.

Each pallet P (FIG. 3) carries a load L thereon. The underside 16 of each pallet P travels upon the top of rollers of conveyor 11 along a pass line 18. Each pallet deflects or bows downwardly somewhat between the spaced conveyor members under load L.

Conveyor 11 is supported by a frame designated generally by numeral 29. Entry guides 15 (FIG. 3) are positioned at the loading station 13 for positive centering of pallets P on the flow lanes 12 when loading.

Centrifugal brakes 21 are positioned along the lanes 12 at locations to control the velocity of pallets P throughout the length of the flow lanes 12 to speeds of from about 30 feet to about 60 feet per minute.

At the unloading station 14, the downstream end of conveyor 11, are stops 23 to provide a deceleration force to stop a pallet P that is to be unloaded at the unloading station 14 substantially without shifting or spilling the load L. Stops 23 may be adjustable to different kinds of pallets and loads in order to maintain deceleration rates as low as 0.4 feet per second per second.

In accordance with principles of the present invention, a holdback assembly or apparatus 22 (FIGS. 2, 4 and 5) is provided to controllably stop one or more upstream pallets P2 when a downstream pallet P1 is at the unloading station 14 or being unloaded from the unloading station 14. Holdback assembly 22 holds and maintains upstream pallets P2 a safe distance 24 from the unloading station P1 to hold the upstream pallet P2 out of contact with pallet P1 so that it may be lifted and removed from the unloading station 14.

The distance between the downstream pallet P1 at the unloading station 14 and the upstream pallet P2 is generally determined after considering the dimensions and weight of pallets P and loads L that are to be used on conveyor 11, the velocity of the pallets, the desired braking distance and time, the desired minimum distance between the upstream pallet P2 and downstream pallet P1, the specific type of conveyor, etc. Preferably, the gap 24 is in the range of 6 to 18 inches, although the specific dimension is not critical to the present invention.

Figure 4:
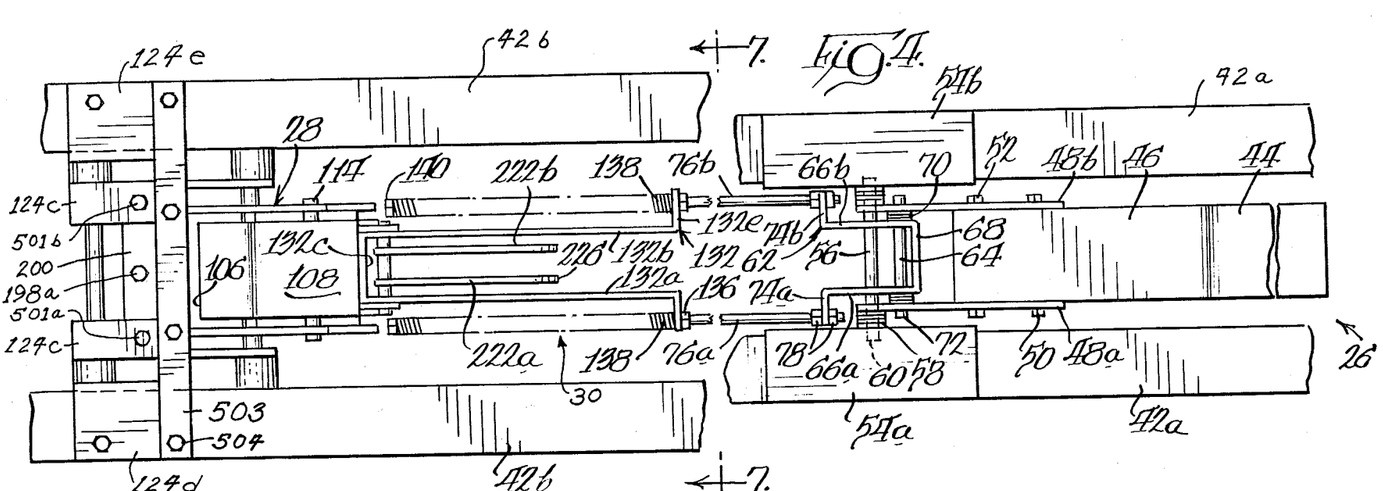
FIG. 4 is a top plan view of a holdback assembly in accordance with principles of the present invention.
Figure 5:
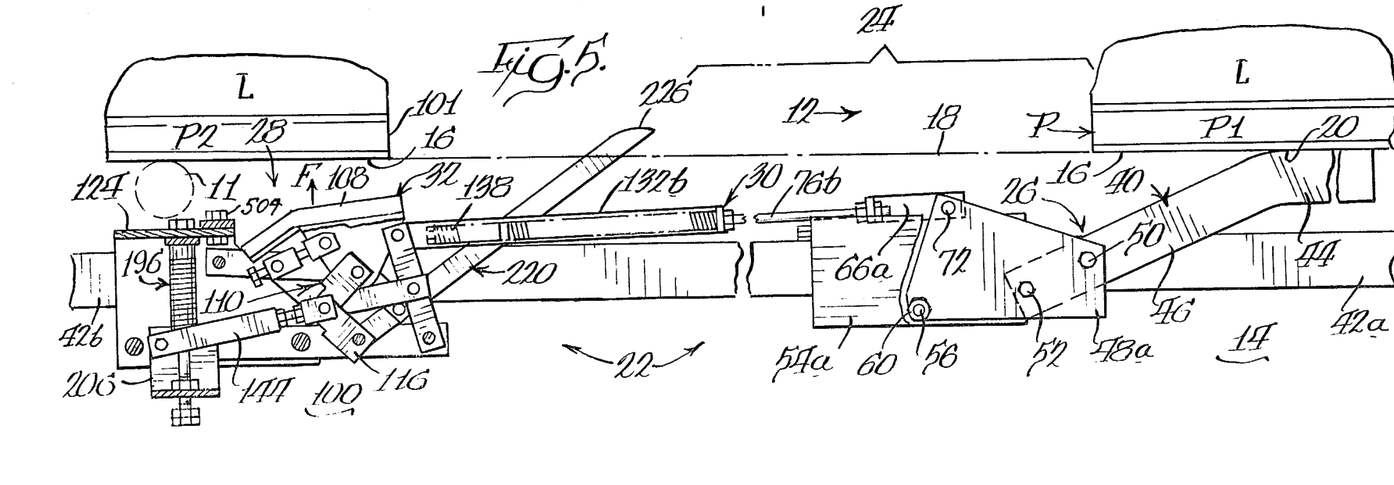
FIG. 5 is a side view of the holdback assembly indicating the direction of flow and illustrating a pallet in the unloading station and an upstream pallet approaching the braking station.

Holdback assembly 22 has a sensor or feeler assembly 26 at unloading station 14 and has a brake assembly 28 upstream of the feeler assembly at a braking station 100. Brake assembly 28 is operatively connected and coupled to feeler assembly 26 by a coupler or drag link connector assembly 30 (FIGS. 4 and 5). Feeler assembly 26 and brake assembly 28 are mounted to frame elements 42a and 42b, respectively, which are mounted to the conveyor supporting frame 29. The parts and components of feeler assembly 26 and brake assembly 28 and connector assembly 30 are made of steel or other metal. Other materials can be used.

Feeler assembly 26 senses the presence of a pallet P1 at the unloading station 14 and activates the brake assembly 28 as a pallet P1 moves into the unloading station 14. The momentum of pallet P1 moving into the unloading station provides the energy for actuating the brake assembly 28. Brake assembly 28 exerts a braking force or deceleration force F against the underside 16 of an upstream trailing pallet P2.

Desirably, the initial braking force exerted by brake assembly 28 is a gradually increasing braking force, while the main subsequent braking force is a generally constant braking force. In the preferred embodiment, the initial braking force is applied gradually during the first 25-50% of the total braking or decelerating time, while the generally constant brake force is applied during the last 50-75% of the total braking or decelerating time. Advantageously, the total braking force F exerted by brake assembly 28 on upstream pallet P2 is sufficient to effectively stop and hold one or more upstream pallets P2 in a consistant controlled manner, which substantially prevents their loads L from shifting or spilling.

While brake assembly 28 preferably engages the underside 16 of the first upstream pallet P2, in some circumstances it may be desirable that brake assembly 28 be located and arranged to engage one or both (requires two assemblies) longitudinal sides (in the direction of flow) of the pallet P2 being conveyed. Furthermore, while holdback assembly 22 is particularly useful in pallet flow systems 10, it may also be useful in connection with a horizontal or inclined gravity flow, non-powered conveyor system, in which packages, machinery or other articles are conveyed without the use of pallets. While it is preferred that the brake assembly 28 engage the underside of the articles, in such circumstances it may be desirable that the brake assembly 28 be mounted to engage the tops or longitudinal sides of the articles. (The underside, top and longitudinal sides of the articles extend generally along the direction of flow and are sometimes referred to as an "engageable" sides or surface of the article, as opposed to the laterally extending front and rear ends or leading and trailing edges of the articles.)

THE BRAKE ASSEMBLY

FIGS. 4–5 and 7–12 of the drawings illustrate a brake assembly 28 which operates in response to the feeler assembly 26, via coupler or drag link connector assembly 30 to apply a braking force F to an upstream pallet P2 at an upstream braking station 100 (FIG. 2), to safely stop and hold upstream pallet P2 at the braking station 100 as downstream pallet P1 is being unloaded at the unloading station 14.

Brake assembly 28 has friction pad 108 which bears against and engages the underside 16 of the first upstream pallet P2 at a location adjacent to the first upstream pallet P2's leading edge 101 (FIG. 5). Friction pad 108 is mounted upon a generally U-shaped support 102 (FIG. 12) and cooperates with the support to provide a friction pad and mounting bracket assembly 32, which has a downwardly inclined lip 106 (FIG. 12) that faces the oncoming flow of pallets P and provides a lead-in portion to brake assembly 28.

Figure 9:
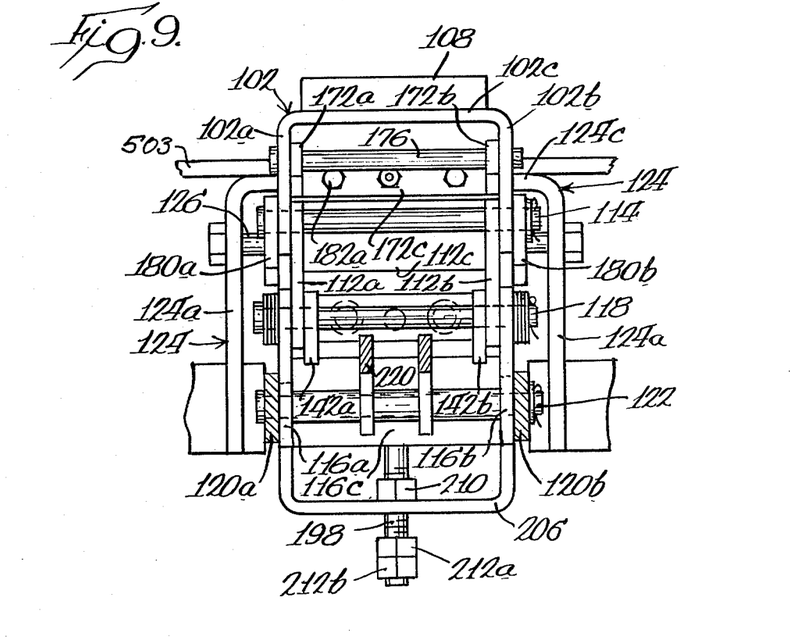
FIG. 9 (on the same sheet as FIG. 7) is an end view of the brake assembly taken substantially along line 9—9 of FIG. 8.
Figure 12:
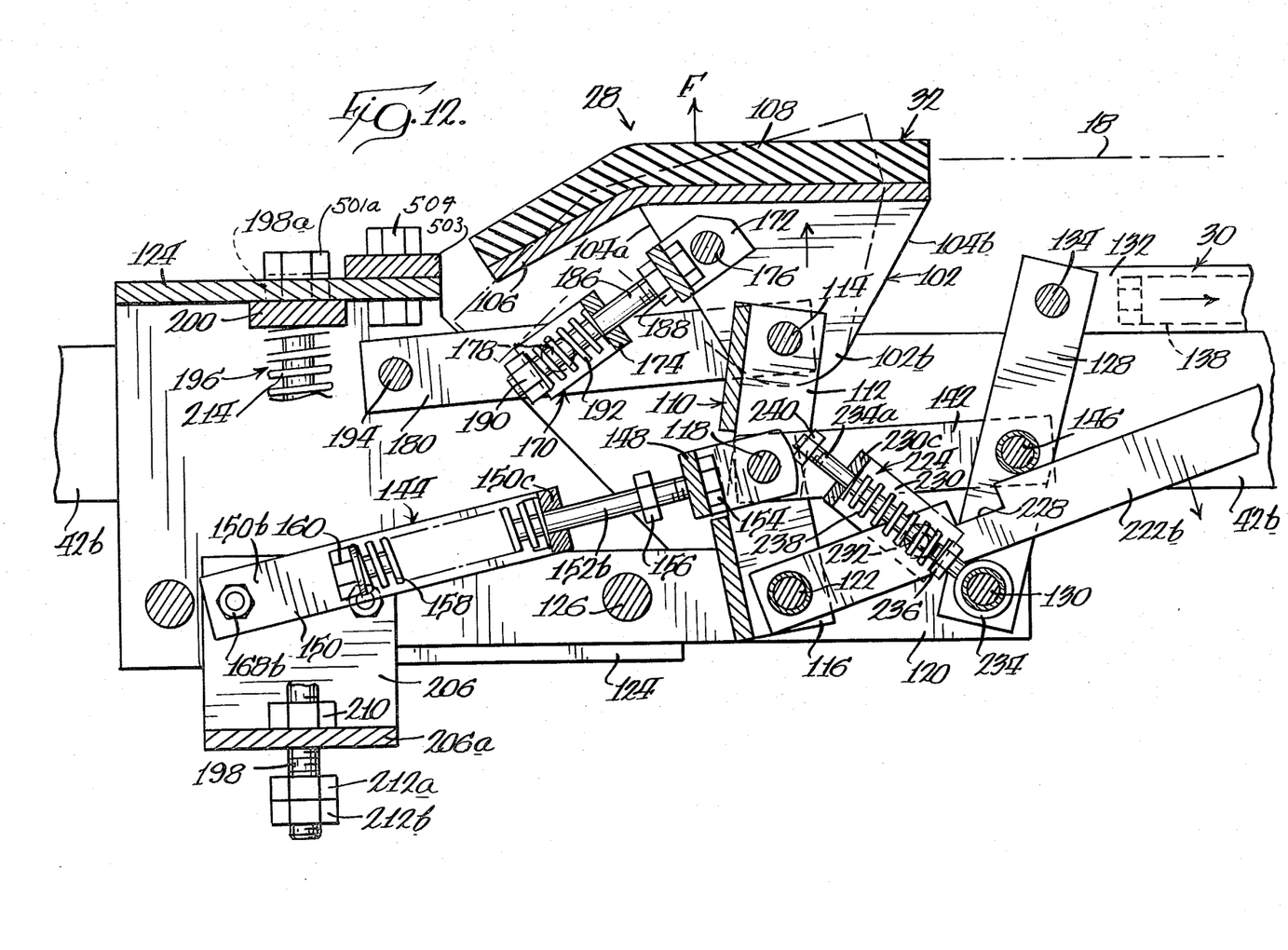
FIG. 12 is a side view of the brake assembly, similar to FIG. 10, and illustrating the brake in full lines in an upward braking position and illustrating the braking surface in broken lines in the position it would assume when no pallet is present.

As best shown in FIG. 9, support 102 includes downwardly depending side walls or legs 102a and 102b and a horizontal head portion or bight 102c. As best shown in FIG. 12, each side wall 102a and 102b is generally triangularly shaped with upwardly flared and diverging side edges 104a and 104b.

In the preferred embodiment, friction pad 108 (FIG. 12) covers support 102 and lip 106 and is secured to the top of support 102 and lip 106 by recessed fasteners or other fastening means. Friction pad 108 is generally rectangular as viewed in top plan view (FIG. 4). Friction pad 108 is made of an abrasive resistant material (such as abrasive resistant rubber) having a relatively high coefficient of friction with the brake contact surface of the pallets being conveyed. It may be desirable in some circumstances, depending on the hardness and type of material of which the underside 16 of the pallets P are constructed, to use a friction pad 108 made of some material, other than rubber.

Figure 10:
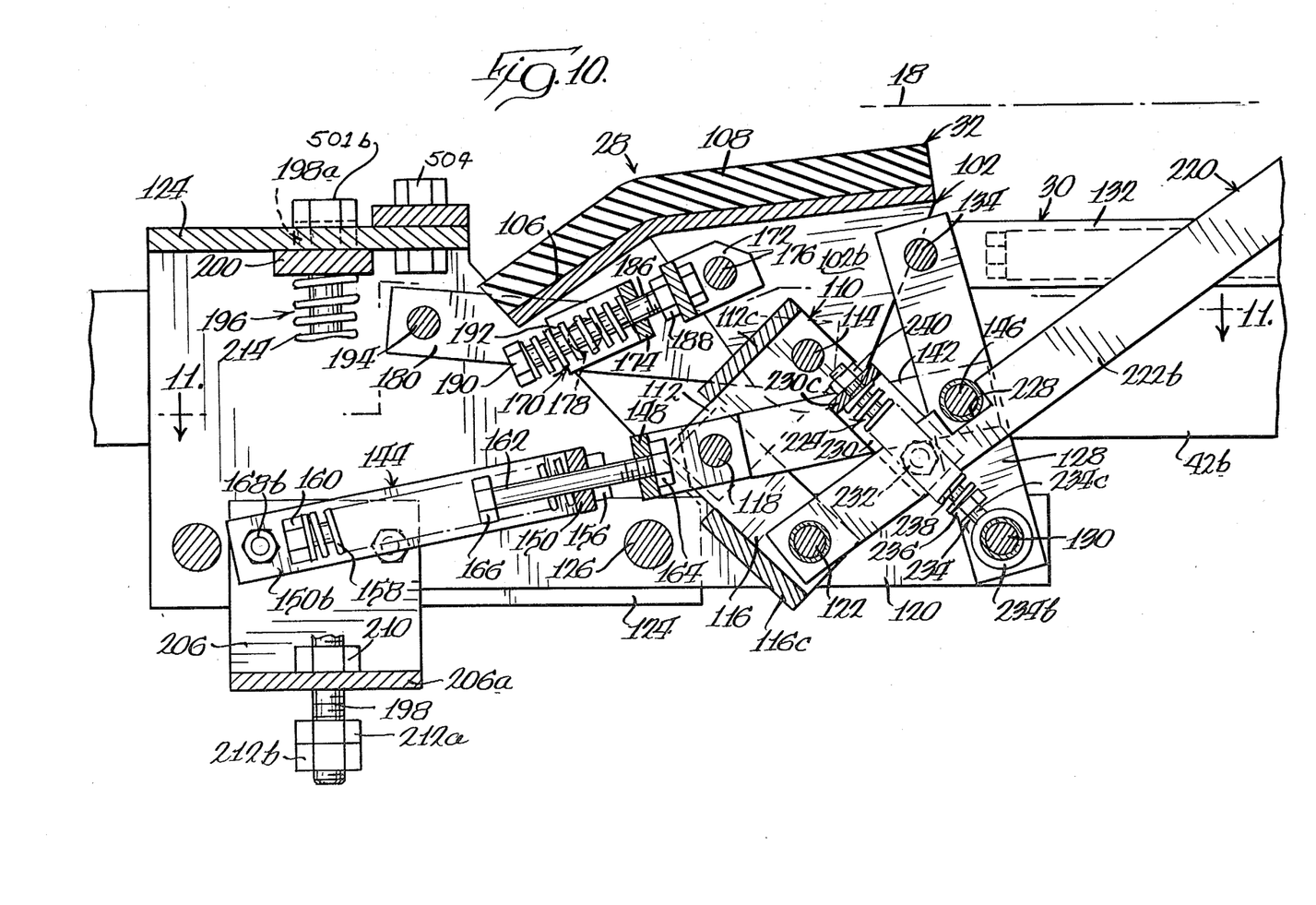
FIG. 10 is an enlarged side view of the brake assembly in a downward released position taken substantially along line 10—10 of FIG. 7.

In order to raise and lower the friction pad 108, as shown in FIGS. 12 and 10, friction pad 108 is operatively connected to a toggle linkage assembly or system 110. As will hereinafter appear, linkage assembly 110 serves as a force multiplier to increase and transmit the inertial energy exerted by pallet P1 upon the feeler 40 (FIG. 5) to the brake assembly 28. The friction pad is pivotally associated with the linkage assembly 110 by a pin 114 extending between the lower ends of the legs 102a and 102b. Linkage means 180 connects the friction pad to frame angle plates 124, and linkage means 180 includes two parallel links 180a and 180b (FIG. 9) having their forward ends pivotally connected to support 102 by pin 114 and having their rearward ends pivotally connected to plates 124 by pin 194 (FIG. 10). A friction pad pivot return spring link assembly or mechanism 170 is provided for biasing friction pad 108 toward an inclined position shown in full lines in FIGS. 4, 8, 10 and 12 and in broken lines in FIG. 12, it being understood that the friction pad is movable to the full line position of FIG. 12 by engagement with the undersurface of a pallet.

Figures 8, 13:
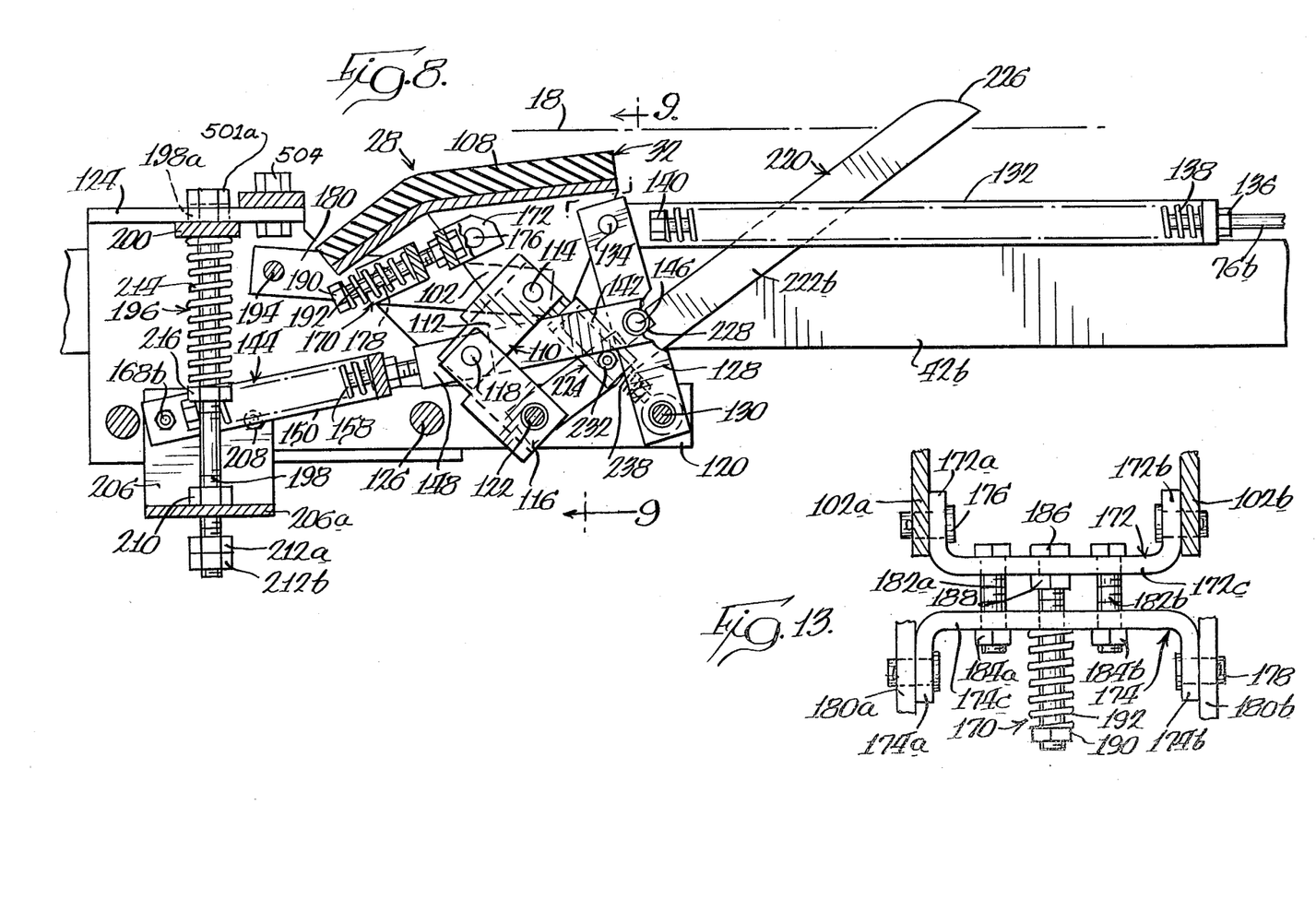
FIG. 8 is a side view of the brake assembly taken substantially along line 8—8 of FIG. 7 and depicting the brake in a downward released position.
FIG. 13 (on the same sheet as FIG. 8) is an enlarged detailed view of the return mechanism for the braking surface assembly.

As shown in FIG. 12, assembly 170 has an upper spring link clevis 172 and a lower spring link clevis 174. Clevis 172 is generally U-shaped as viewed in top plan view, as best shown in FIG. 13, (FIG. 13 is on the same sheet as FIG. 8), with upper clevis legs 172a and 172b and upper clevis cross piece or bight 172c. Upper clevis legs 172a and 172b generally face forwardly in the direction of flow. Both of the upper clevis legs 172a and 172b are suitably apertured adjacent its terminal ends for receiving pivot pins 176, which pivotally connect clevis 172 to legs 102a and 102b of support 102 (see also FIG. 9). In the illustrative embodiment, upper clevis cross piece 172c has three rod-receiving apertures.

Lower clevis 174 (FIG. 13) is generally U-shaped and has legs 174a and 174b and a cross piece or bight 174c. Legs 174a and 174b generally face in the rearward direction and each has an aperture near its terminal end for receiving a pivot pin 178. Pins 178 pivotally connect clevis 174 to the links 180a and 180b of linkage means 180. In the illustrative embodiment, lower clevis cross piece 174c has three rod-receiving apertures which are aligned in registration with the apertures in the upper clevis cross piece 172c.

A pair of bolts 182a and 182b (FIG. 13) are inserted through the outermost apertures of the upper and lower clevis cross pieces 172c and 174c with the heads of the bolts being located adjacent the forward face of the upper clevis cross piece 172c. The lower ends of bolts 182a and 182b receive lower lock nuts 184a and 184b, adjacent the rearward face of the lower clevis cross piece 174c. Lock nuts 184a and 184b and the heads of bolts 182a and 182b serve as abutment stops to limit the maximum separation between the lower and upper clevices 174 and 172, and nuts 184a and 184b are also rotatable to adjust the maximum distance bwtween the upper and lower clevis cross pieces 172c and 174c. Nuts 184a and 184b are adjusted so that the upper surface of the friction pad will be parallel to the pass line when a pallet is passing over it, or when the friction pad 108 is in braking engagement with a pallet.

The intermediate apertures of upper and lower clevis cross pieces 172c and 174c (FIG. 13) receive a central or intermediate bolt 186, and the head of bolt 186 is located on the forward face of upper clevis cross piece 172c, adjacent the heads of bolts 182a and 182b. An lock nut 188 serves as an adjustable abutment stop for the lower clevis cross piece 174c to locate the friction pad in the broken line position shown in FIG. 12, with the lead in portion 106 being disposed below the pass line.

The lower end of bolt 186 receives an adjusting nut which bears against a brake pad return spring 192 disposed about the spring supporting bolt 186. The opposite end of return spring 192 bears against the rearward face of the lower clevis cross piece 174c. Return spring 192 has a sufficient spring constant and strength to normally bias and urge friction pad 108 to an inclined position (FIG. 8) wherein the upper surface of the friction pad is disposed at an angle with respect to the pass line. Advantageously, spring nut 190 can be rotated either towards or away from the lower clevis cross piece 174c to increase or decrease the compression of return spring 192.

Linkage assembly 110 (FIG. 12) has an upper toggle link 112 which is pivotally connected to linkage means 180 and to the lower portion of support 102 by pin 114. As shown in FIGS. 8 and 9, upper toggle link 112 is generally U-shaped with generally upright toggle link arms 112a and 112b and a cross member 112c.

As best shown in FIGS. 10 and 12, lower toggle link 116 is pivotally connected to the lower portion of upper toggle link 112 by toggle pivot pin 118. As shown in FIGS. 9 and 10 lower toggle link 116 is generally U-shaped with upwardly extending lower toggle link arms 116a and 116b connected to a lower cross member 116c.

Lower toggle link 116 is pivotally connected to pivotable support beam 120 (FIG. 10) by pin 122. In the illustrative embodiment, support beam 120 includes a pair of parallel beam arms 120a and 120b (FIGS. 9 and 10).

Figure 7:
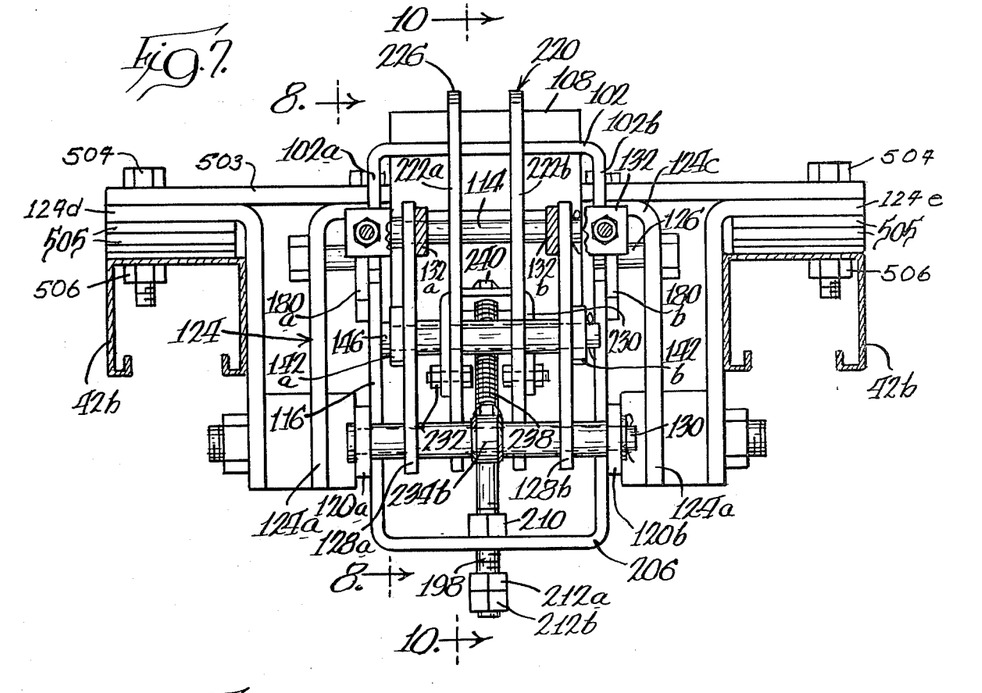
FIG. 7 is an enlarged end view of the brake assembly and portions of the connector assembly taken substantially along line 7—7 of FIG. 4.

The mid-portion of support beam 120 is pivotally mounted to brake support frame or frame angle plates 124 (FIGS. 9, 10 and 11) by pin 126. As best shown in FIGS. 7 and 9, plates 124 have depending frame arms 124a and inwardly extending flange members 124c. Plates 124 are connected by a transversely extending cross bar 200 positioned below flanges 124c and a transversely extending cross bar 503 positioned above flanges 124c.

Figure 11:
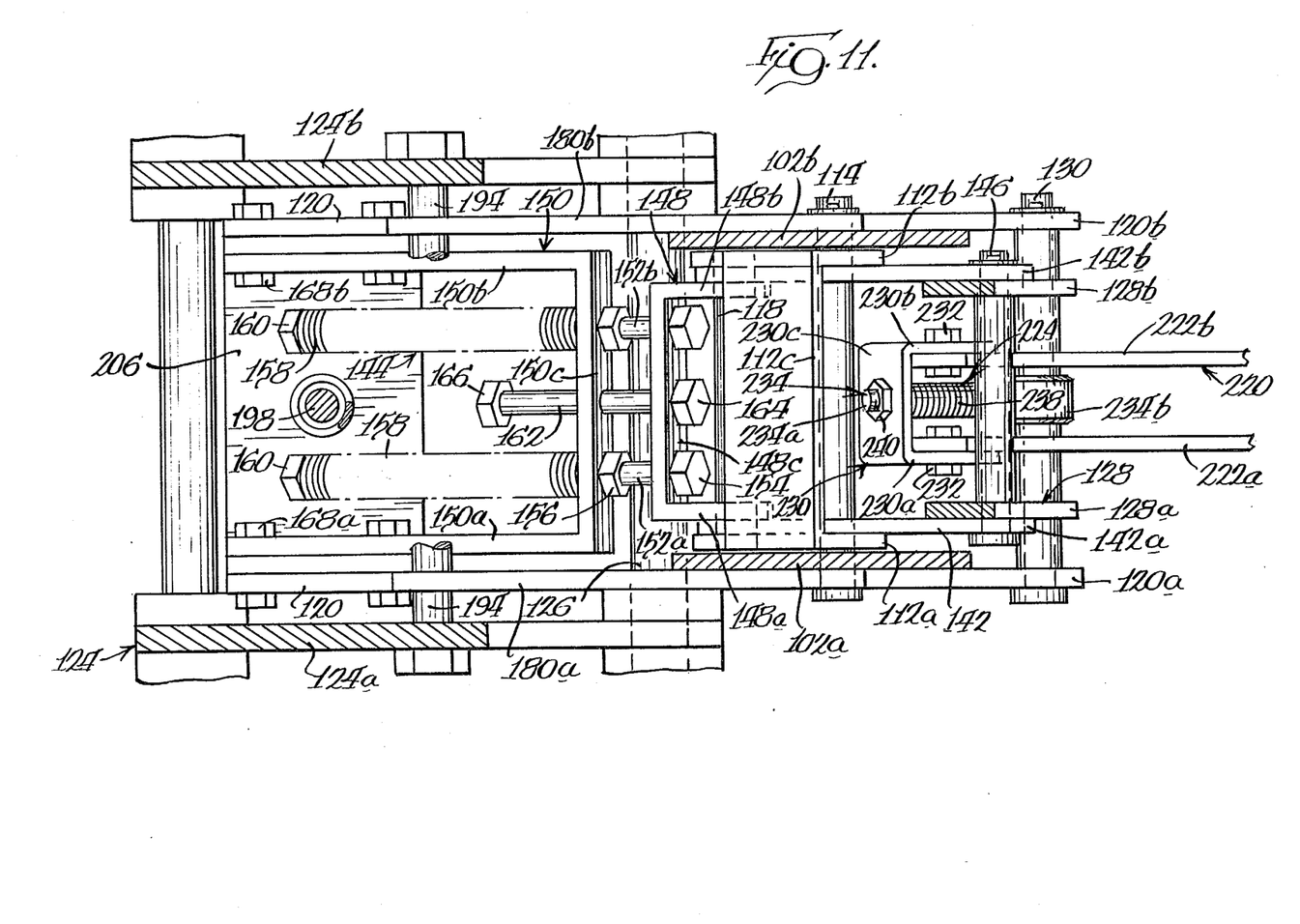
FIG. 11 is an enlarged top plan view of the brake assembly taken substantially along line 11—11 of FIG. 10.

In order to pivotally connect the toggle links 112 and 116 (FIG. 12), via pivotable beam 120, to the coupler or drag link assembly 30, the lower end of a toggle drag lever 128 is pivotally connected to the forward or leading end of the pivotable beam 120 by pivot pin 130, and a toggle drag link 142 (comprised of link arms 142a and 142b) is pivotally connected to pin 118 and to the mid-portion of lever 128 by pin 146. As shown in FIG. 11, toggle drag lever 128 includes a pair of generally parallel toggle drag link arms 128a and 128b. The upper end of toggle drag lever 128 (FIGS. 8 and 12) is pivotally connected to the rearward or trailing end of a drag link assembly 30 by a pivot pin 134.

As best shown in FIG. 4, drag link assembly 30 includes a drag link connector 132 which is generally U-shaped in top plan view with elongated legs 132a and 132b connected to a cross member 132c. Drag link connector 132 also has outwardly extending flanges 132e connected to the forward or leading end of the elongated legs 132a and 132b to slidably receive tie rods or connecting rods 76a and 76b, when an optional latch mechanism (hereafter described) is used. When the latch mechanism is not used nuts 136 are threaded on tie rods 76a and 76b to clamp the tie-rods against flanges 132e.

From the above, it will be appreciated that when lever 128 is rotated clockwise about pivot 130, pivot 118 will rotate clockwise about pivot 122, and link 180 will be rotated counter-clockwise about pivot 194. This action causes links 112, 116 and 180 to move from the position of FIG. 10 to the position of FIG. 12 and to elevate the brake assembly from a retracted inactive position, to an elevated braking position. As will be hereinafter explained the force to cause the action is obtained from a pallet moving into the unloading station.

The amount of braking force which is transmitted to the friction pad is controlled by a brake spring assembly or mechanism 196 (FIG. 8). Brake spring assembly 196 includes an elongated brake spring-supporting bolt 198 whose head 198a is located above the top of beam spring cross bar 200. Beam spring cross bar 200 is also connected to frame members 124 by bolts 501a and 501b (FIG. 4) and nuts (not shown). The lower end of brake spring support bolt 198 slidably fits through an oversized aperture in the bight portion 206a of a U-shaped bracket 206. Pivotable support beam 120 is connected to bracket 206 by fasteners 168b and 208.

A nut 210 is threadably engaged with bolt 198 adjacent the top of the bracket cross member 206a, to limit the clockwise rotation of pivotable support beam 120 about pin 126. Advantageously, nut 210 can be rotated up or down bolt 198 to selectively vary and adjust the position of brake 32 relative to the pass line 18. The lower end of bolt 198 receives nuts 212a and 212b, which are spaced below bracket cross member 206a, and which serve to limit counterclockwise rotation of pivotable support beam 120 about pin 126.

The brake spring assembly 196 (FIG. 8) has a brake spring or compression spring 214, positioned about bolt 198 and located between the underside of bar 200 and a brake spring adjustment nut 216. The spring selected should have a sufficient spring constant to exert the desired braking force at friction pad 108 after being multiplied and transmitted thereto by support beam 120. Adjustment nut 216 is rotatable towards or away from beam spring cross bar 200 to selectively vary the compression of brake spring 214 so as to adjust the braking forces exerted by the brake spring.

In the illustrative embodiment the distance between brake spring support bolt 198 (FIG. 8) and pin 126 is twice the distance between pins 122 and 126.

When a loaded pallet is over the friction pad 108, and the toggle linkage 110 is moved to the position shown in FIG. 12, the range of holdback forces available for various types of loads is from approximately 80 to 840 pounds. To achieve this, the force exerted by the friction pad 108 against the bottom of the pallet must be from 100 to 1200 pounds. The desired force for a given requirement is obtained by selecting a spring 214 of appropriate spring constant, and the adjustment of nut 216 to achieve the necessary precompression of the spring. When installing the holdback brake, the nut 210 is adjusted so that pivot 122 is approximately $\frac{1}{8}$" above the centered position as shown in FIG. 8. In normal operation with a loaded pallet over the friction pad 108, and the pad in an elevated position as shown in FIG. 12, pivot 122 is approximately $\frac{1}{8}$" below the centered position. Because the distance between bolt 198 and pivot 126 is twice the distance between pivot 126 and pivot 122, spring 214 is compressed an additional $\frac{1}{2}$" from its original precompressed position, and the head 198a of bolt 198 is likewise raised $\frac{1}{2}$" above crossbar 200.

Because of the feeler design, as will hereinafter appear, the motion and force transmitted to drag link connector assembly 30 is produced during approximately 8" of movement of the pallet moving into the unloading station at its controlled velocity. This requires approximately one second, and therefore the upward cycle of the holdback brake assembly is accomplished in that time. Thus, the application of braking force to the pallet is applied gradually during this time period.

It is therefore possible to utilize the holdback brake assembly over a wide range of pallet and load conditions to stop, and hold back a various number of pallets in a flow lane. It is likewise possible to adjust the assembly to provide a range of deceleration forces on the moving pallets.

The adjustment for holdback force may be dictated by the maximum deceleration force allowable to prevent shifting or spilling of loads, or by the number of pallets in the flow lane to be held back by the assembly. Typically, fourteen pallets each carrying 3000 pounds will require a holdback force of approximately 840 pounds to prevent them from flowing past the holdback brake under their combined net downstream force produced by the slope of the gravity conveyor. Thus, in the long lanes holding more than 15 such pallets, additional holdback assemblies may be installed at appropriate points in the lanes between the loading and unloading ends in order to provide the desired holdback function.

It should be noted that the static downstream force per pallet is usually approximately 0.02 times it weight. To stop a moving pallet, a holdback force of that amount plus the force required to bring the moving pallet to a halt is required.

Typically, when a pallet has been stopped and held by the holdback brake, the next pallet is stopped by a combination of the inertial force of the stationary pallet plus some additional sliding of the pallet over the brake. Generally, the first free pallet stopped by the holdback brake slides approximately 4 inches over the brake from the time at which the brake is applied. By the time the rated number of pallets to be held back have accumulated, the first pallet held back will have moved an additional two inches to six inches. Usual settings applied for the adjustments described above for adequate control of deceleration force plus holding back a line of pallets, involve setting the holdback brake for a maximum braking force of 10%–25% more than the net static downstream force of the maximum number of pallets the brake will be expected to hold back.

Pallets are released from the braking station (and the feeler assembly raised as will hereinafter appear) by a toggle return spring link assembly 144 best shown in FIG. 12, which is pivotally connected between pin 118 and beams 120.

Linkage return assembly 144 (FIG. 11) has an upper generally U-shaped bracket or upper toggle return spring clevis 148 with a pair of upper clevis arms 148a and 148b, generally facing forwardly in the direction of flow, and an upper clevis cross member or bight 148c, which has three rod-receiving apertures therein. A lower generally U-shaped bracket or lower toggle return spring clevis 150 is positioned rearwardly of the upper toggle return spring clevis 148. Lower toggle spring clevis 150 has a pair of lower clevis arms 150a and 150b extending generally in the rearward direction and has a lower clevis cross member or bight 150c, which has three rod-receiving apertures therein that are aligned in registration with the apertures of the upper clevis cross member 148c.

The end rod-receiving apertures of the upper and lower toggle return spring clevises 148 and 150, respectively, slidably receive elongated clevis spring supporting rods 152a and 152b. Each elongated spring supporting rod 152a and 152b has an abutment or stop nut 154 (FIG. 11) at its leading end of the forward side of the upper clevis cross member 148c, to connect spring supporting rods 152a and 152b to the upper toggle return spring clevis 148. Each spring supporting rod 152a and 152b also has a threaded portion located between the upper and lower clevis cross member 148c and 150c, for receiving an adjustment nut 156, which, when turned, can vary the length of the linkage return assembly 144 by enlarging or closing the space between the upper and lower toggle return spring clevises 148 and 150.

Each rod 152a and 152b carries an elongated compression spring or a linkage return spring 158 and has a rearward nut 160 at its trailing end to adjust spring 158 to the desired force. Linkage return springs 158 are positioned about rods 152a and 152b intermediate the rearward nut 160 and the lower clevis cross member 150c. Linkage return springs 158 have a sufficient spring constant strength, and pre-compression to normally bias and urge the linkage assembly 110 to a downward nonengaging position as shown in FIG. 10, and the feeler assembly to its upward position shown in FIG. 6, as will hereafter appear. Rearward stop nut 160 can be rotated either toward or away from the lower clevis cross member 150c to increase or decrease the amount of precompression in the linkage return springs 158.

The intermediate rod-receiving apertures of the upper and lower clevis cross members 148c and 150c (FIG. 11) receive a centrally disposed stop bolt 162. Bolt 162 has its head 164 located on the forward face of the upper clevis cross member 148c, and a nut 166 is positioned on its threaded rearward portion spaced rearwardly of the lower clevis cross member 150c. Bolt head 164 and nut 166 cooperate to prevent the upper and lower toggle return spring clevises 148 and 150 from separating further than desired.

Rearward nut 166 can be rotated toward or away from lower clevis cross member 150c to increase or decrease the maximum spacing between the upper and lower clevis cross members 148c and 150c so as to permit adjustment of the overall length of the linkage return assembly 144 and particularly to prevent the toggle linkage 110 from going over center.

In the illustrative embodiment, the rearward trailing ends of the lower clevis arms 150a and 150b (FIG. 11) are pivotally connected to support beam arms 120a and 120b, respectively, by linkage return pivot pins 168a and 168b (FIGS. 11 and 12).

In use, linkage return assembly 144 (FIGS. 5 and 8) normally urges the linkage assembly 110 to its downward nonengaging position when the feeler assembly 26 is not pulling the drag link connector 132, that is when there is no pallet P1 at the unloading station 14. When the feeler assembly 26 actuates the brake assembly 28 to its braking position as shown in FIG. 12, drag link connector 132 will pull on the linkage return assembly 144, via toggle drag link 142, causing compression of linkage return springs 158 and separation of the upper and lower toggle return spring clevises 148 and 150. It should be understood that nut 160 has been preadjusted to a position to prevent the toggle linkage 110 from moving over center when the brake is in the elevated braking position.

The Feeler Assembly

Figure 6:
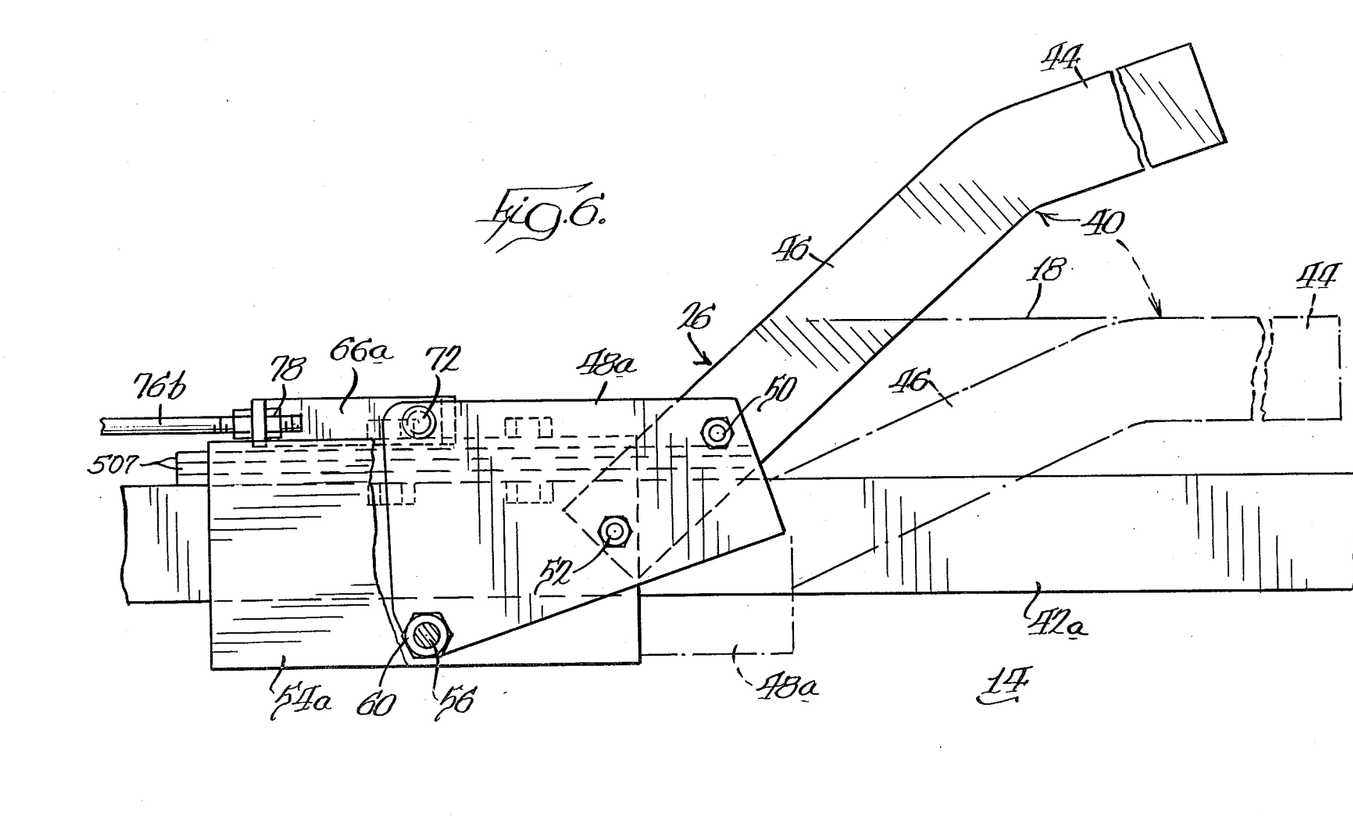
FIG. 6 is an enlarged side view of the feeler assembly with a feeler in a raised sensing position and showing in phantom line the feeler in a depressed pallet-engaging position.

Feeler assembly 26 senses or detects the presence of a pallet P1 to be unloaded at the unloading station 14. As best shown in FIGS. 4–6, feeler assembly 26 has a pivotable elongated leg or feeler 40 mounted above frame member 42a. Pivotable leg 40 has an inclined head 44 and an elongated lower leg portion 46 depending downward therefrom at an obtuse angle. The overall length of the head 44 is greater than the maximum spacing between the bottom boards of the pallet P1. Head 44 and lower leg portion 46 are generally rectangular as viewed in top plan view as best shown in FIG. 4.

The lower end of leg portion 46 is secured to a pair of parallel plates 48a and 48b (FIGS. 4 and 6) by fasteners 50 and 52. The rearward or trailing end of polygonal plates 48a and 48b are pivotally connected to a pair of parallel support plates 54a and 54b (FIG. 4) by pivot pin 56. Support plates 54a and 54b are mounted to frame 42a. In the illustrative embodiment, feeler plates 48a and 48b are spaced from support plates 54a and 54b by spacers 58 (FIG. 4), and pivot pin 56 has threaded ends which are connected to support plates 54a and 54b by nuts 60.

When properly installed, leg 40 is pivotable about pivot pin 56 from a normal upward sensing position extending above pass line 18, as shown in solid line in FIG. 6, when no pallet is at the unloading station 14, to a downward pallet-engaging position bearing against and engaging the underside 16 of a pallet P1, when a downstream pallet P1 is at the unloading station, as shown in FIG. 5 and in dotted line or phantom in FIG. 6. When leg 40 is in the downward pallet-engaging position, the top of head 44 is generally parallel to the direction of flow along pass line 18 at unloading station 14.

In operation, when pallet P1 enters loading station 14, the leading edge of pallet P1 will dynamically engage and strike the top surface of lower portion 46 of leg 40, causing leg 40 to pivot downward in the direction of flow. As the pallet P1 continues to move into the unloading station 14 and into engagement with the stopping device at the end of the flow lane, the underside 16 of the pallet P1 will continually cause leg 40 to pivot downwardly until the underside 16 of the pallet P1 rides upon the top of the head 44 and leg 40 assumes the downward pallet-engaging position as shown in FIG. 5.

The coupler assembly 30 which operatively connects and couples the feeler assembly 26 to brake assembly 28, includes a generally U-shaped coupler or drag link feeler connector 62 (FIG. 4) which is pivotally connected to feeler plates 48a and 48b by pivot pin 64 and can also be considered part of the feeler assembly 26. The sides 66a and 66b (FIG. 4) of U-shaped coupler 62 are suitably apertured to receive pin 64 and are spaced from feeler plates 48a and 48b by means of spacers 70 adjacent the bight portion 68 of the U-shaped coupler 62. Spacers 58 and 70 cooperate to locate the feeler in the center of the conveyor. The ends of the connecting pin 64 are apertured and are connected to feeler plates 48a and 48b by suitable cotter pins 72.

The rearward ends of the U-shaped coupler 62 have laterally extending flanges 74a and 74b (FIG. 4) which are secured to a pair of elongated threaded tie rods or connecting rods 76a and 76b by nuts 78 in clamping engagement with opposite faces of flanges 74a and 74b. In the illustrative embodiment, tie rods 76a and 76b are generally parallel and extend in the direction of flow.

In use, as a pallet P1 enteres the unloading station 14 and depresses pivotable leg 40 to its downward pallet-engaging position as shown in FIG. 5, feeler assembly 26 will activate the brake assembly 28 through tie rods 76a and 76b. When the pallet P1 is lifted and moved from the unloading station by a forklift truck or the like after being unloaded, pivotable leg 40 will return and be biased to its normal upward sensing position by the force of return and feeler biasing assembly 144 (FIG. 5) acting on the toggle linkage 110 and through link 142 and lever 128 to lift the feeler to its up position when no pallet is moving against or over the feeler.

As is evident from FIGS. 1 and 2, the feeler assembly is located at the end of the flow lane which insures that the feeler will be fully depressed by a pallet at the unloading station. The holdback assembly is positioned upstream from the feeler assembly by a distance which insures that the pallet which is being held back will not contact the pallet at the unloading station. In order to prevent the upstream pallet P2 from contacting the downstream pallet P1 at the unloading station, as downstream pallet P1 is being lifted and removed, leg 40 (FIG. 5) of feeler assembly 26 has a great enough overall length to swing upwardly but not cause release of brake assembly 28, until the pallet P1 has been completely withdrawn from over the head 44 in the direction of flow.

Adjustment of Holdback and Feeler Assemblies

The present invention includes means for controlling the relationship of the feeler assembly and holdback brake assembly relative to the pass line. Such means is provided because loaded pallets of various types resting on the conveyor undergo different static deflections. Further, the lifting force applied to the pallets by the holdback brake assembly reduces this deflection. Therefore, each installation requires measurement of the static deflection and spring constant of the loaded pallets, and appropriate calculations integrating the lifting force required for desired braking effect in order to determine the proper relationship of the feeler assembly and holdback brake assembly relative to the pass line, and any compensation that must be made to insure proper operation of such assemblies.

As noted above, the feeler assembly is carried by L-shaped plates 54a and 54b which are secured to frame elements 42a. In like manner, the holdback brake assembly is secured to frame elements 42b (FIGS. 4 and 7) by L-shaped support plates 124d and 124e and bolts 504 and nuts 506. Frame members 42a and 42b are secured to the frame 29 by transversely extending support bars. In order to properly position the feeler assembly and holdback brake assembly relative to the pass line, shims 505 (FIG. 7) and 507 (FIG. 6) are positioned beneath the horizontally disposed flanges on frame members 124d and 124e, and 54a and 54b, respectively. The number and thickness of the shims that are utilized will depend upon the calculations which integrate the measurement of the static deflection and spring constant of the loaded pallets and the lifting force required for the desired braking effect.

The Latch Assembly

All pallets deflect or bow downwardly somewhat under load L. When loads vary, deflections vary.

Deflection is also a factor of the type of material which the pallet P are made of. In the illustrative embodiment the pallets P are made of wood, although other materials can be used.

Even if the loads L are generally equal, deflections will often vary somewhat from pallet to pallet because they will typically have slightly different deflection characteristics. When the difference in pallet deflection is large and the holdback assembly has been adjusted by shims 505 to work properly with pallets having the least deflection, it is possible that the brake assembly may not function properly when a pallet is in the unloading station to depress the feeler and elevate brake assembly to the position of FIG. 12. Under such circumstances, when no pallet is positioned above the brake assembly the friction pad and mounting bracket assembly will be in the broken line position of FIG. 12, and because of the unfavorable angle of the friction pad and mounting bracket assembly, engagement of the friction pad by an oncoming pallet with a large deflection may not effectuate pivotal movement of the friction pad and mounting bracket assembly from the broken line position of FIG. 12 to the fall line position In order to substantially avoid this problem, the holdback assembly 22 (FIG. 5) preferably has an auxiliary latch assembly or mechanism 220, which is operatively connected to and an integral part of brake assembly 28.

As will hereinafter appear, the latch assembly prevents the aforedescribed brake elevating mechanism from functioning until a pallet is positioned thereabove even though a pallet has been stopped in the unloading station.

Latch assembly 220 has a pair of latch members 222a and 222b (FIG. 4), which are biased by latch return spring link assembly 224 (FIG. 8) to lean downstream of friction pad 108 in the direction of flow above pass line 18. The downstream end 226 of each latch member 222a and 222b is rounded to smoothly engage and be ridden upon by an upstream pallet P2. Ends 226 are spaced a sufficient distance downstream of friction pad 108 to assure that a portion of the underside 16 of the first upstream pallet P2 is above the friction pad 108 before the latch is released to actuate brake assembly 28.

As best shown in FIGS. 8 and 10, the lower ends of the latch members 222a and 222b are pivotably connected to beam 120 by pivot pin 122. Each latch member 222a and 222b has an intermediate portion that defines a generally U-shaped channel or upwardly facing notch 228 for engaging latch pin 146. The length of the notch 228 is greater than the maximum diameter of latch pin 146, and notch 228 has a depth slightly less than the diameter of latch pin 146.

In order to urge latch members 222a and 222b upward, a latch return spring assembly 224 (FIGS. 8 and 11) is provided. It will be understood that the latch members 222a and 222b are pivoted downwardly against the bias of assembly 224 by a pallet moving down the conveyor to release the latch and permit the brake assembly to be raised into braking position. Latch return spring assembly 224 has a generally U-shaped latch return bracket or clevis 230 (FIG. 11) with elongated clevis arms 230a and 230b, extending generally in the direction of flow as viewed in top plan view, and a lateral cross member or bight 230c. Clevis arms 230a and 230b are pivotally connected to the rearward ends of latch members 222a and 222b by bolts 232 or other fasteners.

Cross member 230c (FIG. 11) has a central aperture for receiving the rearward end 234a of a pivotable latch spring supporting rod 234. The forward end of latch spring support rod 234 preferably is in the form of an annular collar or bushing 234b for pivotally receiving pivot pin 130.

As shown in FIG. 10, the lower threaded portion 234c of the latch spring support rod 234 receives a lower latch spring nut 236. Lower latch spring nut 236 supports a latch return compression spring 238 about rod 234. Latch return spring 238 has a sufficient spring constant and strength to normally urge latch assembly 220 to an upper latching or locking position as shown in FIGS. 8 and 10. In the illustrative embodiment, latch return spring 238 is positioned between and engaged by the lower latch spring nut 236 and cross member 230c.

The upper threaded portion of rod 234 receives an upper latch spring nut 240, which is located adjacent the upper face of the cross member 230c. Latch spring nuts 236 can be rotated toward or away from latch return spring 238 to selectively increase or decrease the precompression of latch return spring 238.

Operation

When the are no pallets present at the unloading station 14, the pivotable leg or feeler 40 (FIG. 6) of the feeler assembly 26 will be raised above the pass line 18 by the biasing force of the return assembly 144 (FIG. 5) and latch bars 220 will be biased above the pass line by latch return spring link assembly 224.

When a loaded pallet P1 is conveyed to the unloading station 14 from upstream of the holdback assembly, the pallet P1 will engage latch bars 220 and pivot them downwardly to allow the pallet to pass freely to the unloading station. After the pallet passes latch bars 220 the latch return spring assembly returns the latch bars to their raised position to reengage pin 146 with notch 228. As the pallet then moves into the unloading station the feeler 40 is engaged and gradually moved downwardly. When the pallet is stopped in the unloading station, the flattened end 44 of the feeler is positioned generally parallel to the underside 16 of pallet P1.

Movement of feeler 40 to a pallet-engaging position will cause the coupler 62 and tie rods 76a and 76b (FIG. 4) to move forwardly relative to drag link connector 132 to compress the cock and drag link compression springs 138 that are retained on the rods 76a and 76b against flanges 74a and 74b by nuts 140. Pin 146 and notch 228 cooperate to prevent the holdback brake assembly from being operated, and the inertial energy of the pallet moving into the unloading station is stored in springs 138. When the next pallet P2 (FIG. 5) reaches the latch members 222a and 222b, it will trip the latch members 222a and 222b, which will unlock the latch assembly 220 and release the brake 32, which will then be actuated by the energy stored in springs 138.

Specifically, when the first upstream pallet P2 reaches the latch members 222a and 222b, pallet P2 will engage and ride upon latch members 222a and 222b, causing the latch members 222a and 222b to move downwardly beneath the pass line 18. Such action will initially cause notches 228 (FIG. 12) to move downwardly and away from latch pins 146, unlocking latch assembly 220, and releasing drag link compression springs 138. This will permit the drag link compression springs 138 to expand to their normal position, causing the upper portions of the latch members 222a and 222b, positioned forwardly of notch 2228 to ride along the underside of the latch pin 146. Linkage assembly 110 then moves brake assembly 28 to its upper braking position where the friction pad 108 will bear against and frictionally engage the underside 16 of pallet P2.

For the initial period of braking time, the braking force is applied gradually. During the subsequent period of braking time, the rated or main thrust of braking force is applied at a generally constant level. These braking forces will cause pallet P2 to stop and be held at braking station or braking zone 100 at a safe distance 24 from and out of contact with pallet P1 at unloading station or zone 14. Advantageously, the braking forces exerted on pallet P2 will stop pallet P2 at braking station 100 substantially without any shifting or spillage of load L.

When the next upstream pallet (not shown) comes along, it will engage the trailing end of stopped pallet P2 causing stopped pallet P2 to move slightly forwardly. The powerful braking force F exerted by brake assembly 28, however, is sufficient to stop and hold an entire series or stream of pallets. Preferably, brake assembly 28 can stop and hold 6 to 40 pallets or more depending on the combined load L and weight of the pallets. In the illustrative embodiment, the braking force was set and adjusted to be from about 10% to about 25% more than the static downstream force of the maximum number of pallets being conveyed along the gravity flow conveyor 10, the brake assembly 28 is expected to hold back (the static downstream force is about 2% of the total combined weight of the pallets and load L). For example, 14 pallets each carrying 3,000 pounds of load will require a braking and holdback force of approximately 840 pounds to prevent the pallets from moving or flowing past brake station 100 (FIG. 5).

Typically, after downstream pallet P1 has been unloaded, a forklift truck will lift and withdraw in the direction of its earlier movement pallet P1 and move the pallet P1 to another location. Feeler 40 will move back to its upper sensing position above pass line 18 under the biasing force of linkage return assembly 144 after pallet P1 has been completely removed.

When feeler 40 moves back to its upper sensing position, tie rods 76a and 76b (FIG. 4) and drag link connector 132 responsively move rearwardly, releasing brake assembly 28. Brake assembly 28 will then move below pass line 18 by the linkage return assembly 144 and latch members 220 will be returned to the latched position after pallet P2 moves far enough downstream far enough to move out of engagement with the latch members.

When brake assembly 28 is released, the next pallet P2 will flow downwardly to the unloading station 14, starting the cycle all over again.

When two or more pallets have been stopped in end to end contact with one another by the holdback brake assembly, and pallet P1 is removed from the unloading station and the brake assembly 28 is moved below the pass line, pallet P2 (and the following pallet) will stay in essentially continuous contact with the latch members as these pallets move toward the unloading station. Thus, the latch members will not move to a position above the pass line, but the brake assembly will be elevated into braking engagement with the pallet trailing pallet P2 as pallet P2 moves into the unloading station to gradually depress the feeler member.

In the illustrative embodiment brake assembly 28 is constructed and arranged to exert a braking force F of about 100 pounds to about 1200 pounds. Other braking forces can be employed. As explained previously, the braking force F is a factor of many variables and should be adjusted to meet the needs of the particular circumstances.

While the illustrated arrangement of the holdback assembly 22 is preferred, in some circumstances it may be desirable to employ a plurality of holdback assemblies 22. For example, in long flow lanes 12 holding more than 15 pallets, additional holdback assemblies 22 may be desired to be installed at appropriate locations in the lanes 12 between the loading and unloading stations 14 to limit the downstream load on the holdback assembly above the unloading station.

It is therefore possible to utilize the holdback assembly 22 over a wide range of pallet and load conditions to stop and hold back a number of pallets in a flow lane 12. The construction and arrangement of the brake assembly 28 allows for adjustment of the braking forces F, to provide a range of braking forces F on the moving pallets P. And, means is provided to adjust and compensate for pallet deflection.

The preceding description has been given for ease of understanding only. No unnecessary limitations are to be understood therefrom as modifications will be obvious to those skilled in the art.

What is claimed is:

1. A method of controlling the flow of loaded pallets in a pallet flow system having a downstream unloading station and an upstream braking station, comprising the steps of:
    conveying a first pallet to the unloading station;
    sensing the presence of said first pallet at the unloading station;
    conveying a second pallet to said braking station;
    applying a braking force along the underside of said second pallet at said braking station in response to the presence of said first pallet at the unloading station to safely bring said second pallet to a stop substantially without shifting or spilling the load of said second pallet, said second pallet being gradually braked for a total braking period of time from the application of said braking force until it is brought to a stop, said step of applying a braking force including applying a gradually increasing braking force, and thereafter applying a generally constant braking force, said gradually increasing force being applied for about 25% to about 50% of the total braking time, and said generally constant force being thereafter applied for about 50% to about 75% of the total braking time; and, concurrently,
    preventing said second pallet from contacting said first pallet at said unloading station;
    holding said second pallet while said first pallet is at said unloading station;
    removing said first pallet from said unloading station;
    sensing the removal of said first pallet from said unloading station; and, thereafter,
    releasing said braking force from said pallet; and
    conveying said released second pallet downstream to said unloading station.

2. A method of controlling the flow of loaded pallets in a pallet flow system having a downstream unloading station and an upstream braking station, comprising the steps of:
    conveying a first pallet to the unloading station;
    sensing the presence of said first pallet at the unloading station;
    conveying a second pallet to said braking station;
    applying a braking force along the underside of said second pallet at said braking station in response to the presence of said first pallet at the unloading station to safely stop said second pallet substantially without shifting or spilling the load of said second pallet; and, concurrently,
    preventing said second pallet from contacting said first pallet at said unloading station;

holding said second pallet while said first pallet is at said unloading station;

removing said first pallet from said unloading station;

sensing the removal of said first pallet from said unloading station; and, thereafter, releasing said braking force from said second pallet; and conveying said released second pallet downstream to said unloading station, wherein said braking force is first applied along the underside of said second pallet at a location spaced upstream from the leading edge of said second pallet.

3. A method of controlling the flow of loaded pallets in a pallet flow system having a downstream unloading station and an upstream braking station, comprising the steps of:

conveying a first pallet to the unloading station;

sensing the presence of said first pallet at the unloading station;

conveying a second pallet to said braking station;

applying a braking force along the underside of said second pallet at said braking station in response to the presence of said first pallet at the unloading station to safely stop said second pallet substantially without shifting or spilling the load of said second pallet; and, concurrently;

preventing said second pallet from contacting said first pallet at said unloading station;

holding said second pallet while said first pallet is at said unloading station;

removing said first pallet from said unloading station;

sensing the removal of said first pallet from said unloading station; and, thereafter, releasing said braking force from said second pallet; and conveying said released second pallet downstream to said unloading station, further including the step of sensing the presence of said second pallet at said braking station after said first pallet has arrived at said unloading station, and applying said braking force only after the leading edge of said second pallet has traveled past the location of application of said braking force.

4. A method of controlling the flow of loaded pallets in a pallet flow system in accordance with claim 3 wherein said step of sensing the presence of said second pallet at said braking station after said first pallet has arrived at said unloading station, includes engaging the underside of said second pallet.

5. A method of controlling the flow of articles in a gravity flow conveyor system having a downstream unloading station and an upstream braking station, wherein each article has at least one engageable surface extending in the direction of flow, comprising the steps of:

conveying a first article to the unloading station;

sensing the presence of said first article at the unloading station;

conveying a second article to said braking station;

applying a braking force along the engageable surface of said second article for a period of time at said braking station in response to the presence of said first article at the unloading station to safely stop said second article substantially without spilling said second article; and, concurrently, preventing said second article from contacting said first article at said unloading station;

holding said second article while said first article is at said unloading station;

removing said first article from said unloading station;

sensing the removal of said first article from said unloading station; and, thereafter, releasing said braking force from said second article; and conveying said released second article downstream to said unloading station, wherein said step of applying said brake force includes:

applying a gradually increasing braking force for about 25% to about 50% of the total braking time, and, thereafter, applying a generally constant force for about 50% to about 75% of the total braking time.

* * * * *